United States Patent
Chen et al.

(10) Patent No.: US 10,392,788 B2
(45) Date of Patent: Aug. 27, 2019

(54) MULTI-LAYER WATER SEALING DEVICE AND MULTI-LAYER WATER SEALING METHOD

(71) Applicant: KANGZHIWEI ZHEJIANG TECHNOLOGY CO., LTD., Zhejiang (CN)

(72) Inventors: Xiangqian Chen, Beijing (CN); Furu Wei, Beijing (CN)

(73) Assignee: Kangzhiwei Zhejiang Technology Co., Ltd. (CN)

( * ) Notice: Subject to any disclaimer, the term of this patent is extended or adjusted under 35 U.S.C. 154(b) by 111 days.

(21) Appl. No.: 15/320,955

(22) PCT Filed: Jun. 24, 2015

(86) PCT No.: PCT/CN2015/082148
§ 371 (c)(1),
(2) Date: Dec. 21, 2016

(87) PCT Pub. No.: WO2016/000551
PCT Pub. Date: Jan. 7, 2016

(65) Prior Publication Data
US 2017/0204593 A1    Jul. 20, 2017

(30) Foreign Application Priority Data
Jun. 30, 2014  (CN) .......................... 2014 1 0306873

(51) Int. Cl.
*E03C 1/28* (2006.01)
*E03F 5/04* (2006.01)
(Continued)

(52) U.S. Cl.
CPC ................. *E03C 1/28* (2013.01); *E03C 1/24* (2013.01); *E03C 1/284* (2013.01); *E03C 1/29* (2013.01);
(Continued)

(58) Field of Classification Search
CPC . E03C 1/28; E03C 1/281; E03C 1/284; E03C 1/29; E03F 2005/0416; E03F 2005/0418; E03F 5/0407
(Continued)

(56) References Cited

U.S. PATENT DOCUMENTS

| 1,137,488 | A | * | 4/1915 | Hyde | ..................... F16K 17/42 |
| | | | | | 137/397 |
| 4,026,317 | A | * | 5/1977 | Ekstrom | ................... E03C 1/29 |
| | | | | | 137/216.1 |
| 5,458,769 | A | * | 10/1995 | Johannessen | ......... E03F 5/0407 |
| | | | | | 210/163 |
| 5,711,037 | A | * | 1/1998 | Reichardt | ............... E03C 1/281 |
| | | | | | 4/144.1 |

(Continued)

FOREIGN PATENT DOCUMENTS

| CN | 86200034 U | 6/1987 |
| CN | 2525133 Y | 12/2002 |

(Continued)

*Primary Examiner* — Erin Deery
*Assistant Examiner* — Nicholas A Ros
(74) *Attorney, Agent, or Firm* — BakerHostetler (57) ABSTRACT

A multi-layer water sealing device, includes at least two layers of water seal sequentially arranged from top to bottom. An upper-layer water seal has a floating bell-shaped cover structure, and the floating bell-shaped cover structure includes a water sealing box and a floating bell-shaped cover arranged in the water sealing box. A lower-layer water seal is arranged in a drain pipe below the floating bell-shaped cover, and one side of the water sealing box is extended to form or connected to a communication cavity offset from the drain pipe. The floating bell-shaped cover correspondingly is extended to form or connected to a floating component floatable in the communication cavity and offset from the drain pipe.

14 Claims, 8 Drawing Sheets (51) Int. Cl.
  *E03D 11/00*   (2006.01)
  *E03F 5/042*   (2006.01)
  *E03C 1/24*    (2006.01)
  *E03C 1/284*   (2006.01)
  *E03C 1/29*    (2006.01)

(52) U.S. Cl.
  CPC .............. *E03D 11/00* (2013.01); *E03F 5/04* (2013.01); *E03F 5/042* (2013.01); *E03F 2005/0416* (2013.01); *Y02A 30/68* (2018.01)

(58) Field of Classification Search
  USPC ..................................... 137/397, 428; 4/679
  See application file for complete search history.

(56) References Cited

U.S. PATENT DOCUMENTS

| | | | | |
|---|---|---|---|---|
| 2009/0307837 A1* | 12/2009 | Gan | ........................... | E03C 1/26 4/679 |
| 2012/0167296 A1* | 7/2012 | Nomura | .................. | E03C 1/281 4/311 |

FOREIGN PATENT DOCUMENTS

| | | | | |
|---|---|---|---|---|
| CN | 201400925 Y | | 2/2010 | |
| CN | 102518188 | * | 6/2012 | ............. E03C 1/284 |
| CN | 102518188 A | | 6/2012 | |
| CN | 102518189 A | | 6/2012 | |
| CN | 103850306 A | | 6/2014 | |
| CN | 104060656 A | | 9/2014 | |
| CN | 204080978 U | | 1/2015 | |
| JP | 2006-037535 A | | 2/2006 | |
| JP | 2011032797 A | | 2/2011 | |
| WO | WO 02/092926 A1 | | 11/2002 | |

* cited by examiner

MULTI-LAYER WATER SEALING DEVICE AND MULTI-LAYER WATER SEALING METHOD

This application is the national phase of International Application No. PCT/CN2015/082148, titled "MULTI-LAYER WATER SEALING DEVICE AND MULTI-LAYER WATER SEALING METHOD", filed on Jun. 24, 2015, which claims the benefit of priority to Chinese Patent Application No. 201410306873.5 titled "MULTI-LAYER WATER SEALING DEVICE AND MULTI-LAYER WATER SEALING METHOD", filed with the Chinese State Intellectual Property Office on Jun. 30, 2014, the entire disclosures of both applications are incorporated herein by reference.

FIELD

The present application relates to the field of building drainage technology, and more particularly to a multi-layer water sealing device and a multi-layer water sealing method.

BACKGROUND

Conventionally, for a sink and its sewer port of a family kitchen, a urinal of a toilet, a floor drain and its sewer port, waste water may overflow in case of a slight clogging. Sometimes a floating bell-shaped cover of the floor drain is removed to prevent clogging, although this can address the issue of sewage clogging, a strong bad smell is emitted from the sewer, thus polluting the environment and affecting people's health.

Figure 1:
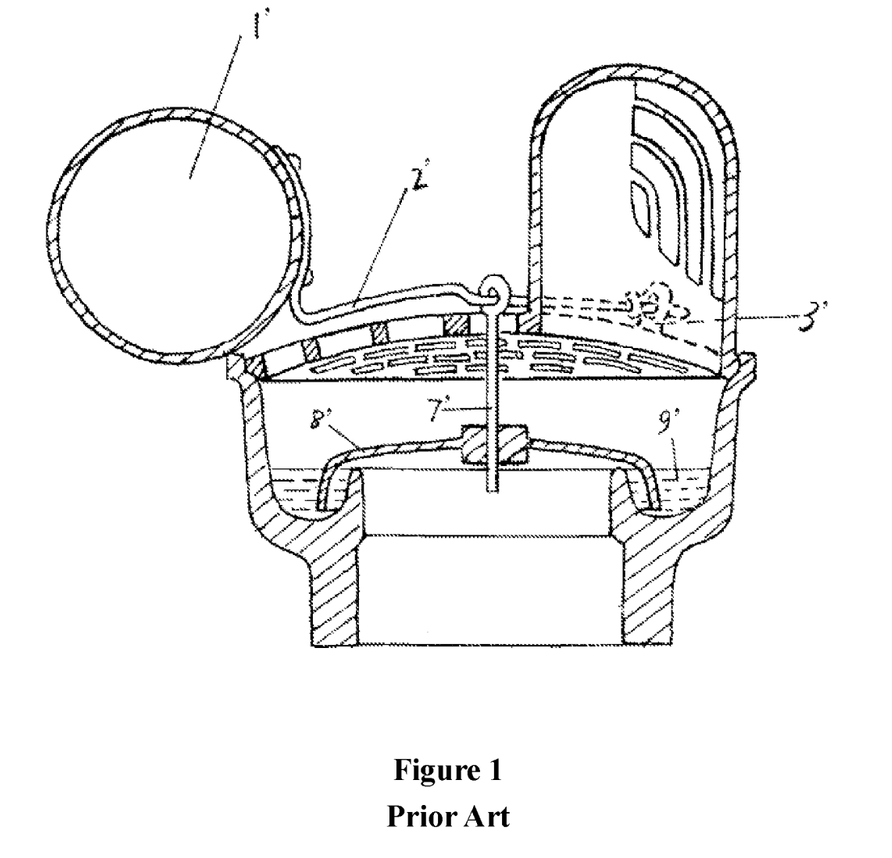
FIG. 1 is a schematic view showing the structure of a deodorant anti-overflow backwater valve in the conventional technology.

Reference is made to FIG. 1, which is a schematic view showing the structure of a deodorant anti-overflow backwater valve. The working principle and the technical defects of the backwater valve are briefly described hereinafter.

As shown in FIG. 1, the backwater valve has a floater 1' connected to one end of a lever 2', another end of the lever 2' is a fulcrum 3', a middle portion of the lever 2' passes through a through hole at a top end of a connecting rod 7', and a bottom end of the connecting rod 7' is connected to an interlocked bell-shaped cover 8', and an edge of the interlocked bell-shaped cover 8' is arranged in an annular concave water seal 9'.

With this structure, when the waste water from an upper sink is discharged into a lower sink, the floater 1' will float according to the amount of the waste water in the lower sink, and bring the connecting rod 7' to move by the lever 2', to drive the interlocked bell-shaped cover 8' below the connecting rod 7' to move up and down to be opened and closed. When a large amount of waste water is stored in the lower sink, and the floater 1' floats high and drives the lever 2' and the connecting rod 7' to move upward, and the interlocked bell-shaped cover 8' is widely opened. When the waste water is drained, the floater 1' will fall down to press the connecting rod 7' downward by the lever 2', and thus the interlocked bell-shaped cover 8' is tightly covered in the annular concave water seal 9' at a lower part of the floor drain, which blocks out the bad smell.

However, when the waste water in the lower sink is drained rapidly, the air pressure in the drainpipe will drop, thereby generating a negative pressure, and generating a suction effect on the interlocked bell-shaped cover 8', and tightly suctioning the interlocked bell-shaped cover 8' to the bottommost end of the annular concave water seal 9'. In addition, the suction force is great, and when waste water in the upper sink is discharged again into the lower sink, a greater buoyancy force is required to pull the interlocked bell-shaped cover 8' upwards, thus bringing inconveniences to water drainage.

In view of this, it is urgent to make a further optimized design to the multi-layer water sealing device in the conventional technology to address the above technical problems, to prevent the bell-shaped cover from being suctioned onto the bottom end of the water sealing box while ensuring a large flow drainage, and improve the working stability of the water sealing device.

SUMMARY

An object of the present application is to provide a multi-layer water sealing device, which can prevent a floating bell-shaped cover from being suctioned to a bottom end of a water sealing box, to improve the working stability of the water sealing device. In addition, another object of the present application is to provide a multi-layer water sealing method.

To address the above technical issues, a multi-layer water sealing device is provided according to the present application, which includes at least two layers of water seal sequentially arranged from top to bottom. An upper-layer water seal has a floating bell-shaped cover structure, and the floating bell-shaped cover structure includes a water sealing box and a floating bell-shaped cover arranged in the water sealing box; and a lower-layer water seal is arranged in a drain pipe below the floating bell-shaped cover, and wherein, the drain pipe is offset from a center of the water sealing box and is arranged adjacent to a first side of the water sealing box, and the floating bell-shaped cover is arranged corresponding to the drain pipe and adjacent to the first side of the water sealing box; and wherein, a floating component connected to the floating bell-shaped cover is further provided in the water sealing box and floatable in the water sealing box, and the floating component is away from the drain pipe and adjacent to a second end, opposite to the first end, of the water sealing box.

With this structure, when waste water in the water sealing box flows away rapidly through the drain pipe, because the floating bell-shaped cover and the drain pipe are arranged corresponding to each other in the up and down direction, and the floating component is offset from the drain pipe by a great distance, the waste water in the water sealing box at a side close to the floating bell-shaped cover flows fast due to being close to the drain pipe, and the waste water in the water sealing box at a side away from the floating bell-shaped cover flows slowly due to being away from the drain pipe. Therefore, in the entire chamber defined by the water sealing box, the buoyancy force of the floating component in the water sealing box is greater than the buoyancy force of the floating bell-shaped cover in the water sealing box, and the farther away from the drain pipe, the greater the buoyancy force. Therefore, compared with the conventional technology, during the process of the waste water flowing rapidly in the multi-layer water sealing device provided by the present application, the floating bell-shaped cover may incline to an outer side of the water sealing box due to unbalanced buoyancy forces, which prevents the floating bell-shaped cover from being tightly suctioned onto a bottom wall of the water sealing box under the action of a negative pressure in the drain pipe, thus improving the working stability of the water sealing device.

Preferably, the floating component is an additional bell-shaped cover.

Preferably, a bottom end of a connecting member is provided with a partition extending downwards, to separate the floating bell-shaped cover from the floating component.

Preferably, at least one self-locking component is provided between the floating bell-shaped cover and the water sealing box, and/or between the floating component and the water sealing box, and/or between the connecting member and the water sealing box, and the at least one self-locking component is configured to prevent the floating bell-shaped cover from being suctioned by a water flow to separately sink to fit against a bottom of the water sealing box.

Preferably, the self-locking component includes an inner wall of the water sealing box and an outer wall of the floating bell-shaped cover, a first self-locking gap is provided between the inner wall of the water sealing box and the outer wall of the floating bell-shaped cover, and the first self-locking gap is configured to enable the inner wall of the water sealing box and the outer wall of the floating bell-shaped cover to come into contact with each other when the floating bell-shaped cover inclines and descends to a preset position; or, the self-locking component includes the inner wall of the water sealing box and an outer wall of the floating component, a second self-locking gap is provided between the inner wall of the water sealing box and the outer wall of the floating component, and the second self-locking gap is configured to enable the inner wall of the water sealing box and the outer wall of the floating component to come into contact with each other when the floating bell-shaped cover descends to the preset position.

Preferably, the self-locking component includes an extending portion configured to enable an inner wall of the water sealing box to come into contact with an outer wall of the floating bell-shaped cover when the floating bell-shaped cover inclines and descends to a preset position, or enable the inner wall of the water sealing box to come into contact with an outer wall of the floating component when the floating bell-shaped cover inclines and descends to a preset position. The extending portion is arranged on the inner wall of the water sealing box, and/or the outer wall of the floating bell-shaped cover, and/or the outer wall of the floating component.

Preferably, an inner side of the floating bell-shaped cover and an inner side of the floating component are respectively provided with corresponding protrusions protruding inwards, and the protrusions are each provided with a positioning groove being opened inwards and having a cross section gradually expanding outwards, and the connecting member is a positioning block cooperatively arranged in the two positioning grooves.

Preferably, the connecting member between the floating bell-shaped cover and the floating component is provided with a vertical through hole, and the self-locking component is a positioning column arranged in the through hole, a third self-locking gap is formed between the positioning column and an inner wall of the through hole, and is configured to allow the positioning column to come into contact with the inner wall of the through hole when the floating bell-shaped cover inclines and descends to a preset position.

Preferably, the connecting member between the floating bell-shaped cover and the floating component is provided with a vertical through hole, and a positioning column is provided in the vertical through hole, and a bottom end of the positioning column is fixedly connected to a bottom wall of the water sealing box. The self-locking component includes a first engaging member arranged on an inner wall of the vertical through hole, and further includes a second engaging member arranged at a top end of the positioning column at a side toward to the floating component, and when the floating bell-shaped cover inclines and descends to a preset position, the first engaging member is engaged with the second engaging member.

Preferably, the self-locking component is further provided with an anti-slip component configured to prevent the floating bell-shaped cover from slipping with respect to the water sealing box in a self-locking travel.

Preferably, the anti-slip component is a protruding edge or a groove arranged in the self-locking component.

Preferably, an initial water passage is a microcosmic gap formed between a bottom end of the floating bell-shaped cover and a bottom wall of the water sealing box when the bottom end of the floating bell-shaped cover and the bottom wall of the water sealing box are in full contact with each other.

A multi-layer water sealing method is further provided according to the present application, which provides at least two layers of water seal arranged sequentially from top to bottom. An upper-layer water seal is a floating bell-shaped cover structure, and the floating bell-shaped cover structure includes a water sealing box and a floating bell-shaped cover arranged in the water sealing box; and a lower-layer water seal is arranged in a drain pipe below the floating bell-shaped cover. The drain pipe is offset from a center of the water sealing box and is arranged adjacent to a first side of the water sealing box, and the floating bell-shaped cover is arranged corresponding to the drain pipe and adjacent to the first side of the water sealing box; and wherein, a floating component connected to the floating bell-shaped cover is further provided in the water sealing box and floatable in the water sealing box, and the floating component is away from the drain pipe and adjacent to a second end, opposite to the first end, of the water sealing box Preferably, the method includes providing at least one self-locking component between the floating bell-shaped cover and the water sealing box, and/or between the floating component and the water sealing box, and/or between the water sealing box and the connecting member, and the at least one self-locking component is configured to prevent the floating bell-shaped cover from being suctioned by a water flow to separately sink to fit against a bottom of the water sealing box.

Preferably, the self-locking component is further provided with an anti-slip component configured to prevent the floating bell-shaped cover from slipping with respect to the water sealing box in a self-locking travel.

Since the above multi-layer water sealing device has the above technical effects, the multi-layer water sealing method corresponding to the multi-layer water sealing device also has the same technical effects, which are not described here.

Corresponding relationships between reference numerals and components in FIG. 1 are as follows:

| 1' | floater, | 2' | lever, |
|---|---|---|---|
| 3' | fulcrum, | 7' | connecting rod, |
| 8' | interlocked bell-shaped cover, | 9' | annular concave water seal. |

Corresponding relationships between reference numerals and components in FIGS. 2 to 11 are as follows:

| 1 | water sealing box, | 11 | inner wall of water sealing box, |
|---|---|---|---|
| 12 | first extending portion, | 13 | upper cover, |
| 131 | water inlet hole, | 132 | connecting gap, |
| 2 | floating bell-shaped cover, | 21 | outer wall of floating bell-shaped cover, |
| 22 | protrusion, | 221 | positioning groove, |
| 3 | drain pipe, | 42 | second extending portion, |
| 5 | connecting member, | 51 | partition, |
| 52 | vertical through hole, | 521 | first engaging member, |
| 53 | positioning column, | 531 | second engaging member, |
| 6 | floating component, | 61 | outer wall of floating component, |
| 7 | anti-slip component, | 8 | initial water passage, |
| 9 | water trap, | 10 | resilient opening and closing device, |
| 101 | fixed plate, | 102 | movable baffle plate, |
| 103 | resilient component, | 104 | fluid through hole. |

DETAILED DESCRIPTION

A core of the present application is to provide a multi-layer water sealing device, which can prevent a floating bell-shaped cover from being suctioned to a bottom end of a water sealing box, to improve the working stability of the water sealing device. In addition, another core of the present application is to provide a multi-layer water sealing method.

For making the person skilled in the art to better understand the technical solutions of the present application, the present application is further described in detail hereinafter in conjunction with drawings and embodiments.

Figure 2:
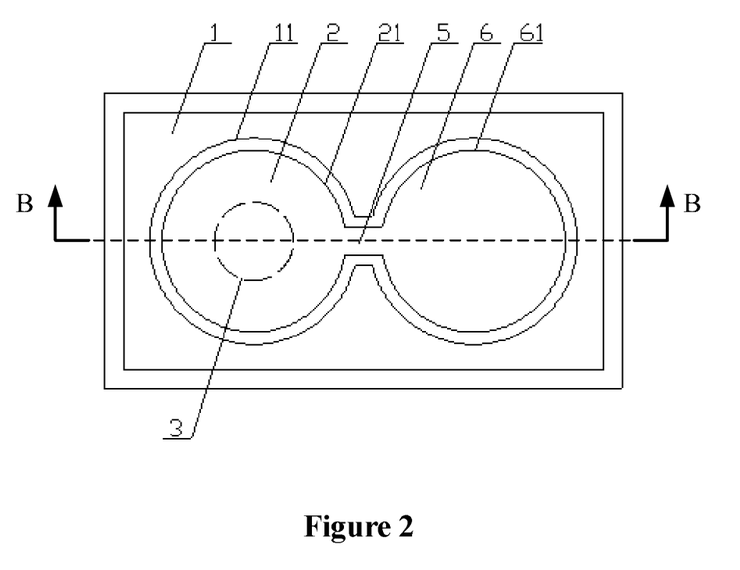
FIG. 2 is a schematic view showing the structure of an embodiment of a multi-layer water sealing device according to the present application.

It is to be noted that, the noun of locality "inner" herein refers to a direction converging to a joint between a floating bell-shaped cover 2 and a floating component 6 from the surrounding area in FIG. 2, and the noun of locality "outer" refers to a direction radiating from the joint between the floating bell-shaped cover 2 and the floating component 6 to the surrounding area in FIG. 2. The noun of locality "transverse" refers to a horizontally extending direction in FIG. 3, the noun of locality "longitudinal" refers to a vertically extending direction in FIG. 2, and the noun of locality "vertical" refers to a vertically extending direction in FIG. 3. It should be appreciated that theses nouns of locality are defined based on the drawings of the specification, and should not affect the scope of protection of the present application.

Figure 3:
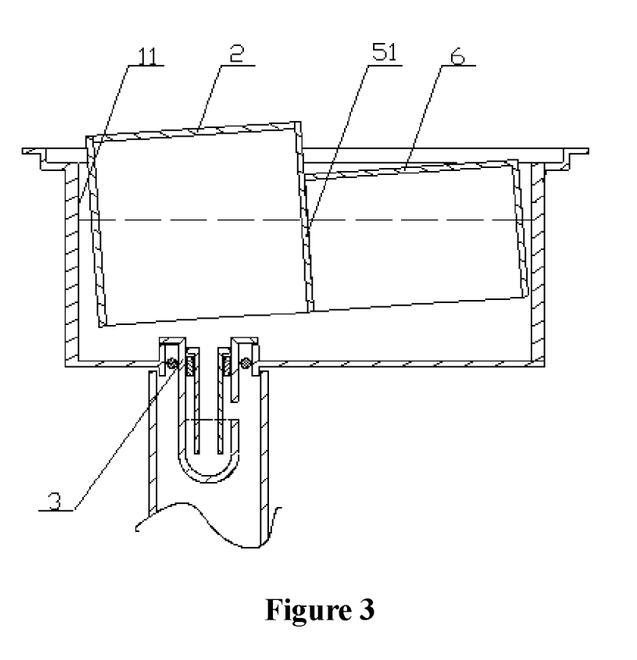
FIG. 3 is a sectional view of FIG. 2 taken along direction B-B when water flows.

Reference is made to FIGS. 2 and 3, FIG. 2 is a schematic view showing the structure of a first embodiment of a multi-layer water sealing device according to the present application; and FIG. 3 is a sectional view of FIG. 2 taken along direction B-B when water flows.

In an embodiment, as shown in FIGS. 2 and 3, a multi-layer water sealing device is provided according to the present application. The multi-layer water sealing device includes at least two layers of water seals sequentially arranged from top to bottom. An upper-layer water seal is a floating bell-shaped cover structure including a water sealing box 1 and a floating bell-shaped cover 2 placed in the water sealing box 1. A lower-layer water seal is placed in a drain pipe 3 below the floating bell-shaped cover 2. One side of the water sealing box 1 is extended to form or connected to a communication cavity offset from the drain pipe 3, and correspondingly, the floating bell-shaped cover 2 is extended to form or connected to a floating component 6 offset from the drain pipe 3, and the floating component 6 is floatable in the communication cavity. The "extended to form or connected to" here means that the floating bell-shaped cover 2 and the floating component 6 may be formed as an integral structure, and may also be directly connected to each other by welding and similar manners, and may also be indirectly connected by a connecting member 5 provided between the floating bell-shaped cover 2 and the floating component 6. In other words, the drain pipe 3 is offset from a center of the water sealing box 1 and is arranged adjacent to a first side (the left side in FIG. 3) of the water sealing box 1, and the floating bell-shaped cover 2 is arranged corresponding to the drain pipe 3 and adjacent to the first side of the water sealing box 1; and the floating component 6 connected to the floating bell-shaped cover 2 is further provided in the water sealing box 1 and floatable in the water sealing box 1, and the floating component 6 is away from the drain pipe 3 and adjacent to a second end (the right side in FIG. 3), opposite to the first end, of the water sealing box 1.

With this structure, as shown in FIG. 3, when waste water in the water sealing box 1 flows away rapidly through the drain pipe 3, because the floating bell-shaped cover 2 and the drain pipe 3 are concentrically arranged, and the floating component 6 is offset from the drain pipe 3 by a great distance, the waste water in the water sealing box 1 at the first side close to the floating bell-shaped cover 2 flows fast due to being close to the drain pipe 3, and the waste water in the water sealing box 1 at a second side away from the floating bell-shaped cover 2 flows slowly due to being away from the drain pipe 3. Therefore, in the entire chamber defined by the water sealing box 1, the buoyancy force of the floating component 6 in the water sealing box 1 is greater than the buoyancy force of the floating bell-shaped cover 2 in the water sealing box 1, and the farther away from the drain pipe 3, the greater the buoyancy force. Therefore, compared with the conventional technology, during the process of the waste water flowing rapidly in the multi-layer water sealing device provided by the present application, the floating bell-shaped cover 2 may incline to an outer side of the water sealing box 1 due to unbalanced buoyancy forces, which prevents the floating bell-shaped cover 2 from being tightly suctioned onto a bottom wall of the water sealing box 1 under the action of a negative pressure in the drain pipe 3, thus improving the working stability of the water sealing device.

In a specific solution, as shown in FIG. 3, the above floating component 6 may be an additional bell-shaped cover, and since the additional bell-shaped cover has a shape similar to the shape of the floating bell-shaped cover 2, the stress condition of the additional bell-shaped cover is also similar to the stress condition of the floating bell-shaped cover 2, thus facilitating the stress analysis in design and further facilitating determining the dimension of the additional bell-shaped cover according to the stress analysis. In another specific solution, the above floating component 6 may be an additional floater, and the additional floater has features of having a simple structure, and being convenient to manufacture.

It is conceivable that, the above floating component 6 is not only limited to the above two structures, and various shapes and multiple of the floating component 6 may be provided. For example, the above floating component 6 may also adopt a simple plate-like structure or a box-like structure, and the cross section of the floating component 6 may be circular, quadrate, triangular and etc., and the number of the floating component 6 may be one and may also be two or even more.

Figure 4:
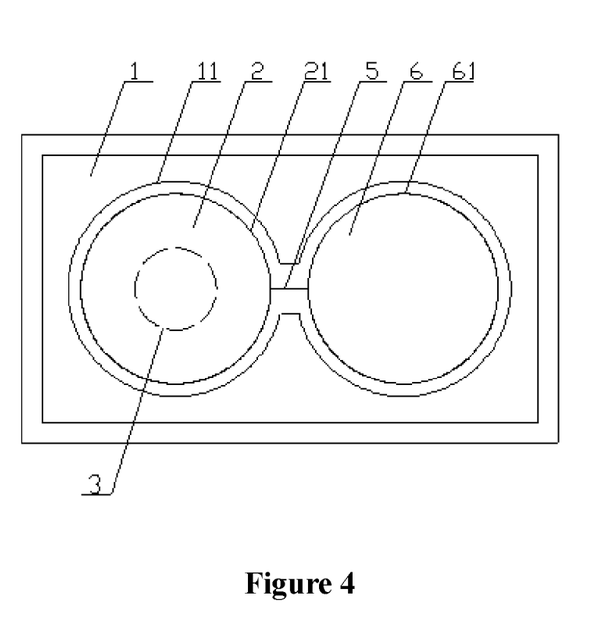
FIG. 4 is a schematic view showing the structure of a second embodiment of the multi-layer water sealing device according to the present application.
Figure 7:
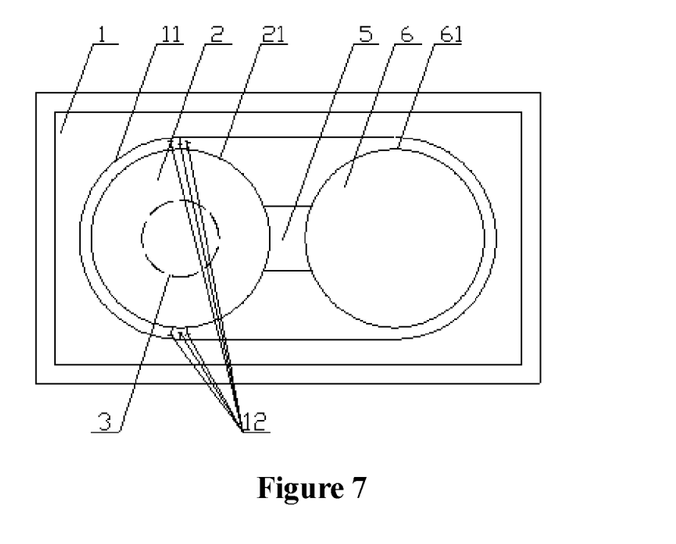
FIG. 7 is a schematic view showing the structure of a fifth embodiment of the multi-layer water sealing device according to the present application.

Furthermore, an inner wall 11 of the water sealing box of the multi-layer water sealing device may also have various shapes. For example, as shown in FIG. 4, the inner wall 11 of the water sealing box forms a glasses-shaped chamber. For another example, as shown in FIG. 7, the entire chamber formed by the water sealing box 1 may be an elliptic chamber. Of course, the water sealing box 1 may also be embodied in other various shapes.

In a more specific solution, as shown in FIG. 3, the floating bell-shaped cover 2 is connected to the floating component 6 by the connecting member 5, and a bottom end of the connecting member 5 may be provided with a partition 51 extending downward to separate the floating bell-shaped cover 2 from the floating component 6.

With this structure, since the floating bell-shaped cover 2 is separated from the floating component 6 by the partition 51, the speed of the waste water at a lower side of the floating component 6 flowing to a lower side of the floating bell-shaped cover 2 may be further lowered, therefore the difference between the buoyancy forces at the lower sides of the floating component 6 and the floating bell-shaped cover 2 is further increased, thus further preventing the floating bell-shaped cover 2 from being suctioned onto the bottom wall of the water sealing box 1.

Of course, the connecting member 5 is not limited to the above structure, for example, as shown in FIG. 3, the connecting member 5 may be a connecting plate. For another example, as shown in FIG. 4, the connecting member 5 may also be a simple connecting rod, and the connecting rod may extend transversely as shown in FIG. 4, and may also extend vertically, or may be embodied in other various forms. In another specific solution, referring further to FIG. 6, an inner side of the floating bell-shaped cover 2 and an inner side of the floating component 6 are respectively provided with corresponding protrusions 22 protruding inwards, and the protrusions 22 are each provided with a positioning groove 221 being opened inwards and having a cross section gradually expanding outwards, and the connecting member 5 is a positioning block cooperatively arranged in the two positioning grooves 221.

In another specific embodiment, as shown in FIGS. 5 to 8, at least one self-locking component is provided between the floating bell-shaped cover 2 and the water sealing box 1, and/or between the floating component 6 and the water sealing box 1, and/or between the water sealing box 1 and the connecting member 5, and the self-locking component is configured to prevent the floating bell-shaped cover 2 from being suctioned by the water flow to separately sink to fit against the bottom of the water sealing box 1.

Figure 5:
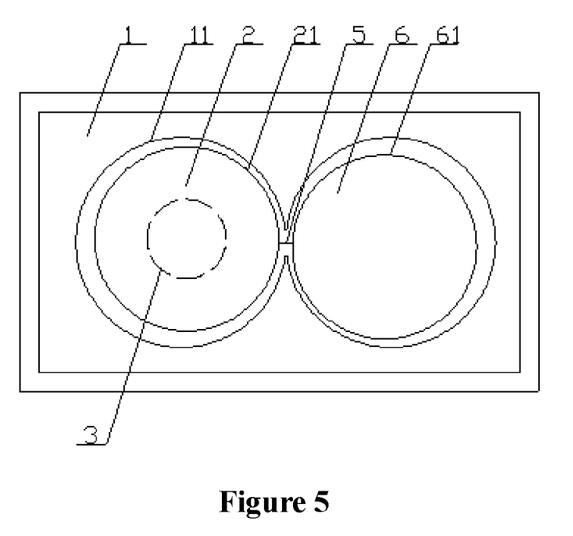
FIG. 5 is a schematic view showing the structure of a third embodiment of the multi-layer water sealing device according to the present application.

In a specific solution, as shown in FIG. 5, the self-locking component may include the inner wall 11 of the water sealing box and an outer wall 21 of the floating bell-shaped cover. A first self-locking gap is provided between the inner wall 11 of the water sealing box and the outer wall 21 of the floating bell-shaped cover, and the first self-locking gap is configured to enable the inner wall 11 of the water sealing box to come into contact with the outer wall 21 of the floating bell-shaped cover when the floating bell-shaped cover 2 tilts down to a preset position.

With this structure, when the waste water in the water sealing box 1 flows away rapidly through the drain pipe 3, the floating bell-shaped cover 2 inclines and descends due to the effect of unbalanced buoyancy forces, and when the floating bell-shaped cover 2 moves to the preset position, the outer wall 21 of the floating bell-shaped cover comes into contact with the inner wall 11 of the water sealing box to generate crossed and twisted friction forces, and the friction forces can stop the floating bell-shaped cover 2 from continuing to incline and descend, to prevent the floating bell-shaped cover 2 from sinking separately, and further improve the anti-suction effect of the floating bell-shaped cover 2.

It is conceivable that, the self-locking component may further include the inner wall 11 of the water sealing box 1 and an outer wall 61 of the floating component, and a second self-locking gap is provided between the inner wall 11 of the water sealing box 1 and the outer wall 61 of the floating component, and the second self-locking gap is configured to enable the inner wall 11 of the water sealing box 1 to come into contact with the outer wall 61 of the floating component when the floating bell-shaped cover 2 descends to a preset position.

Similar to the above structure, with this structure, when the waste water in the water sealing box 1 flows away rapidly through the drain pipe 3, the floating bell-shaped cover 2 inclines and descends due to the effect of unbalanced buoyancy forces, and when the floating bell-shaped cover 2 moves to the preset position, the outer wall 61 of the floating component comes into contact with the inner wall 11 of the water sealing box 1 to generate crossed and twisted friction forces, and the friction forces can stop the floating bell-shaped cover 2 from continuing to incline and descend, to prevent the floating bell-shaped cover 2 from sinking separately, and further improves the anti-suction effect of the floating bell-shaped cover 2.

Figure 6:
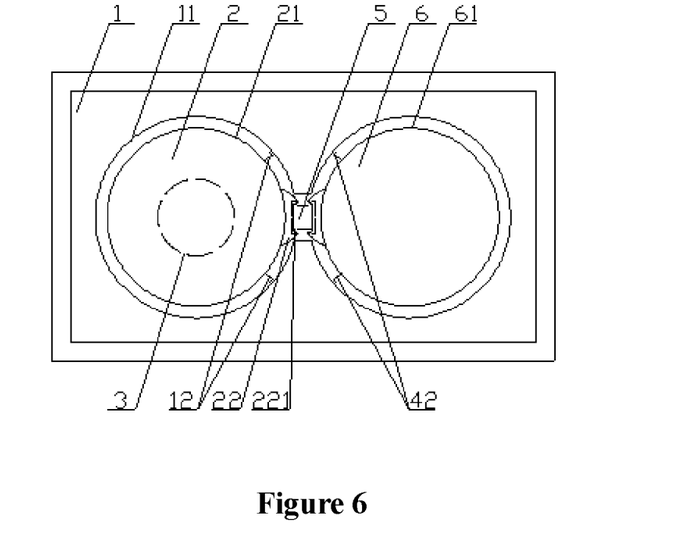
FIG. 6 is a schematic view showing the structure of a fourth embodiment of the multi-layer water sealing device according to the present application.

In another specific solution, as shown in FIG. 6, the self-locking component may include a first extending portion 12. The first extending portion 12 is configured to enable the inner wall 11 of the water sealing box to come into contact with the outer wall 21 of the floating bell-shaped cover when the floating bell-shaped cover 2 inclines and descends to a preset position. The first extending portion 12 is provided on the inner wall 11 of the water sealing box and/or the outer wall 21 of the floating bell-shaped cover.

With this structure, when the floating bell-shaped cover 2 inclines and moves downwards due to unbalanced buoyancy forces caused by the waste water flowing away rapidly through the drain pipe 3, since the first extending portion 12 extends along a longitudinal direction of the floating bell-shaped cover 2, which is equivalent to narrow the gap between the floating bell-shaped cover 2 and the water sealing box 1, thereby enabling the floating bell-shaped cover 2 to come into contact with the inner wall 11 of the water sealing box when the floating bell-shaped cover 2 moves to the preset position. In this way, crossed and twisted friction forces are also generated between the floating bell-shaped cover 2 and the water sealing box 1, and the friction forces can also stop the floating bell-shaped cover 2 from continuing to incline and descend, and further improve the anti-suction effect of the floating bell-shaped cover 2.

The number of the first extending portion 12 may be one and may also be more than one. The first extending portion 12 may be only provided on the inner wall 11 of the water sealing box, or may be only provided on the outer wall 21 of the floating bell-shaped cover, and may also be arranged on both the inner wall 11 of the water sealing box and the outer wall 21 of the floating bell-shaped cover. The first extending portion 12 may extend transversely, longitudinally, or vertically.

In a similar solution, as shown in FIGS. 6 and 7, the self-locking component may further include a second extending portion 42. The second extending portion 42 is configured to enable the inner wall 11 of the water sealing box 1 to come into contact with the outer wall 61 of the floating component when the floating bell-shaped cover 2 inclines and descends to a preset position. The second extending portion 42 is arranged on the inner wall 11 of the water sealing box 1 and/or the outer wall 61 of the floating component.

Similar to the structure of the first extending portion 12, the second extending portion 42 extending longitudinally is also equivalent to narrow the gap between the floating component 6 and the water sealing box 1, and also can allow crossed and twisted friction forces to be generated between the water sealing box 1 and the floating component 6 when the floating bell-shaped cover 2 moves to a preset position, to stop the floating bell-shaped cover 2 from continuing to incline and descend, and further improve the anti-suction effect of the floating bell-shaped cover 2.

The number of the second extending portion 42 may be one, and may also be more than one, and the second extending portion 42 may be only arranged on the inner wall 11 of the water sealing box 1, or may be only arranged on the outer wall 61 of the floating component, and may also be arranged on both the inner wall 11 of the water sealing box 1 and the outer wall 61 of the floating component. The second extending portion 42 may extend transversely, longitudinally, or vertically.

Of course, the self-locking component is not limited to be arranged between the floating bell-shaped cover 2 and the water sealing box 1, and/or between the floating component 6 and the water sealing box 1, and may also be arranged between the water sealing box 1 and the connecting member 5.

Figure 8:
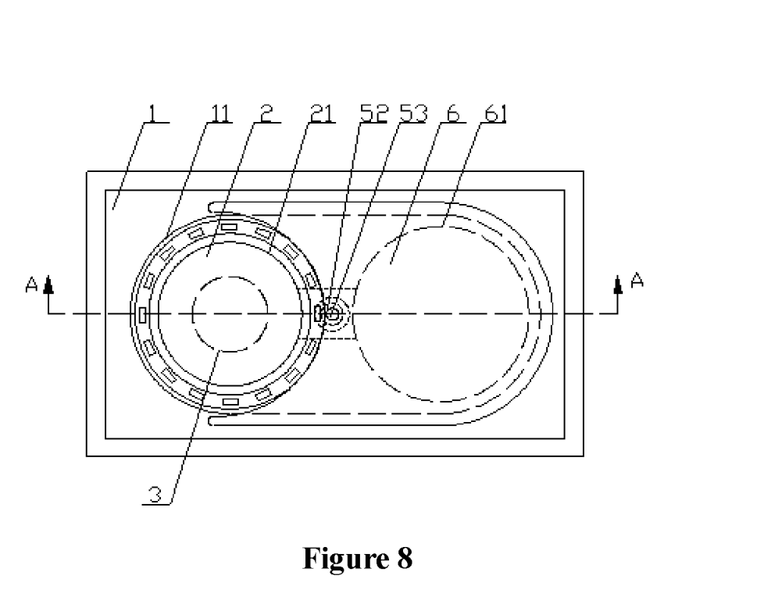
FIG. 8 is a schematic view showing the structure of a sixth embodiment of the multi-layer water sealing device according to the present application.
Figure 9:
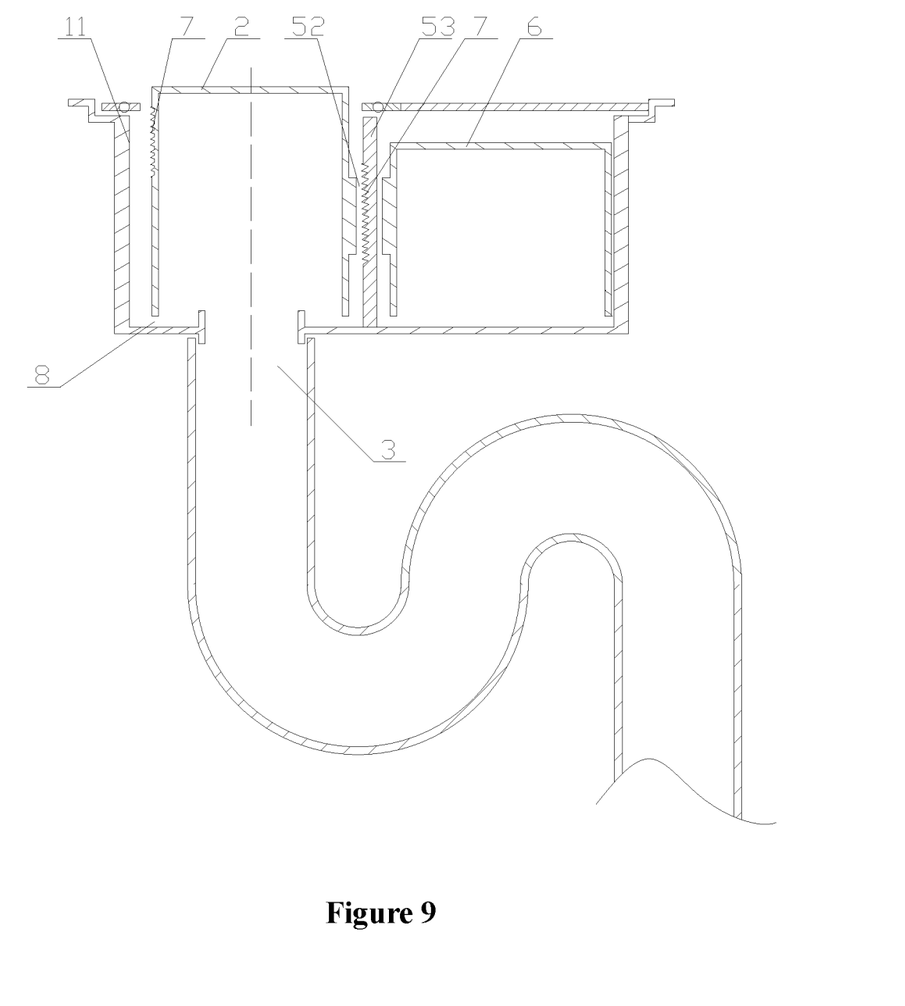
FIG. 9 is a sectional view of FIG. 8 taken along direction A-A.

In another specific solution, as shown in FIGS. 8 and 9, the connecting member 5 between the floating bell-shaped cover 2 and the floating component 6 is provided with a vertical through hole 52, and the self-locking component is a positioning column 53 arranged in the vertical through hole 52. A third self-locking gap is provided between an inner wall of the vertical through hole and the positioning column 53, and enables the positioning column 5 to come into contact with the inner wall of the vertical through hole when the floating bell-shaped cover 2 inclines and descends to a preset position. The positioning column 53 is fixedly connected to the bottom wall of the water sealing box 1.

In this structure, by reasonably setting the third self-locking gap, the positioning column 53 may be enabled to come into contact with the inner wall of the through hole when the floating bell-shaped cover 2 moves to the preset position due to the effect of unbalanced buoyancy forces, that is, crossed and twisted friction forces are generated to stop the floating bell-shaped cover 2 from continuing to incline and descend, and further improve the anti-suction effect of the floating bell-shaped cover 2.

Figure 10:
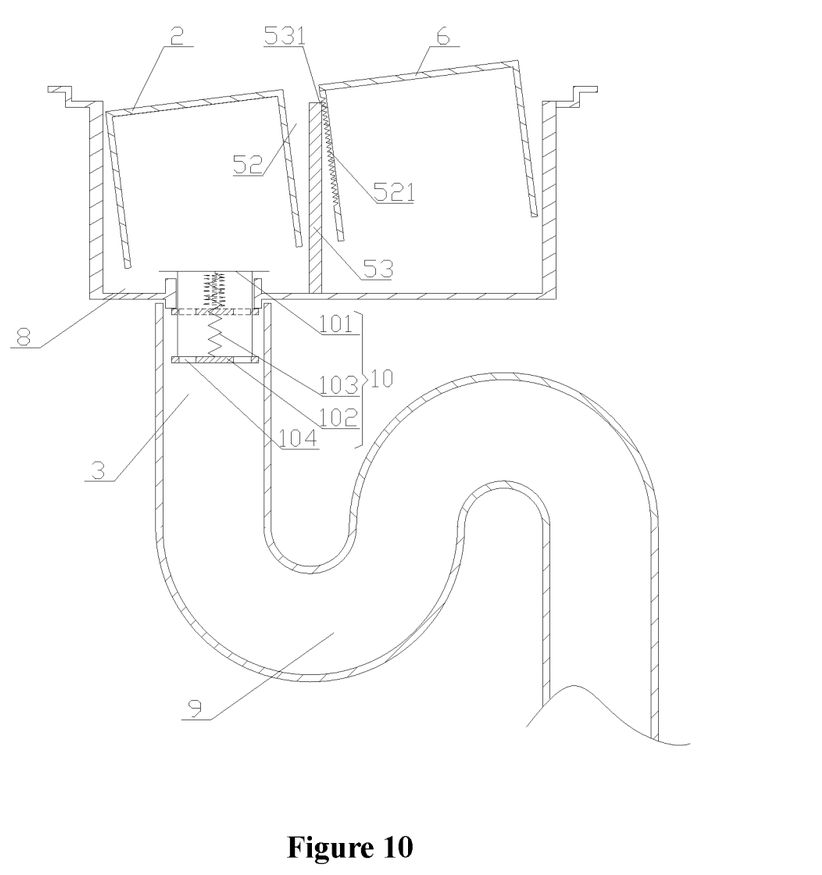
FIG. 10 is a schematic view showing the structure of a seventh embodiment of the multi-layer water sealing device according to the present application.

In another specific solution, as shown in FIG. 10, the connecting member 5 between the floating bell-shaped cover 2 and the floating component 6 is provided with a vertical through hole 52, and a positioning column 53 is provided in the vertical through hole 52. The positioning column 53 is fixedly connected to the bottom wall of the water sealing box 1. The self-locking component includes a first engaging member 521 arranged on the inner wall of the vertical through hole 52, and further includes a second engaging member 531 arranged at a top end of the positioning column 53 at a side close to the floating component 6. When the floating bell-shaped cover 2 inclines and descends to a preset position, the first engaging member 521 is engaged with the second engaging member 531.

In this structure, as shown in FIG. 10, when the floating bell-shaped cover 2 inclines and descends due to unbalanced buoyancy forces caused by the waste water flowing away rapidly through the drain pipe 3, the first engaging member 521 on the inner wall of the through hole is engaged with the second engaging member 531 of the positioning column 53 when the floating bell-shaped cover 2 moves to the preset position, that is, crossed and twisted friction forces are generated to stop the floating bell-shaped cover 2 from continuing to incline and descend, and further improve the anti-suction effect of the floating bell-shaped cover 2. When the floating bell-shaped cover 2 moves upwards, the floating bell-shaped cover 2 and the floating component 6 restore vertical movement without interfering with the positioning column 53, and ascend smoothly.

The first engaging member 521 and the second engaging member 531 may be embodied in various manners.

For example, the first engaging member 521 may be a protruding edge or a groove or an internal screw thread, and the first engaging member 521 may be arranged on the inner wall of the vertical through hole 52 only at a side away from the floating bell-shaped cover 2 and in a corresponding height range of this side close to the top end of the positioning column 53 in the travel of floating upwards and downwards, because this position is a self-locked and engaged position. Of course, for the convenience of manufacturing, the first engaging member 521 may also be arranged on the whole inner wall of the vertical through hole 52.

The second engaging member 531 may be the top end of the positioning column 53 itself, and the top end may be embodied in various shapes such as a cylindrical shape, a rectangular shape, a square shape and etc. (as long as it is not a spherical shape with an completely smooth outline), and the top end in each of these shapes can engage with the protruding edge, the groove or the screw thread. In addition, when the first engaging member 521 is a protruding edge, a groove, or an internal screw thread, the second engaging member 531 may be a groove, a protruding edge, or an external screw thread cooperating with the first engaging member 521.

Figure 11:
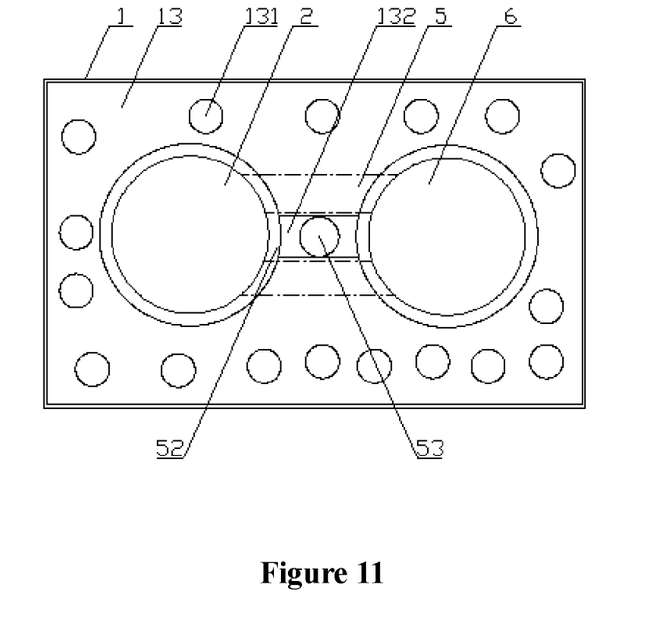
FIG. 11 is a schematic view showing the structure of an eighth embodiment of the multi-layer water sealing device according to the present application.

In another specific embodiment, as shown in FIG. 11, an upper cover 13 of the water sealing box 1 may also have a function of limiting the maximum displacement of ascending of the floating bell-shaped cover 2 and the floating component 6.

In a specific solution, for the structure of the glasses-shaped chamber formed by the inner wall of the water sealing box 1 as shown in FIGS. 4 and 11, the connecting member 5 may be embodied as two connecting blocks connected between the floating bell-shaped cover 2 and the floating component 6, and the vertical through hole 52 is formed between the two connecting blocks, and the positioning column 53 is arranged in the vertical through hole 52. Accordingly, the upper cover 13 of the water sealing box 1 may also be embodied in a matched glasses shape, and a connecting gap 132 configured to receive the positioning column 53 is provided in the upper cover 13 at a position between a portion corresponding to the water sealing box 1, and the connecting gap 132 has a dimension smaller than that dimension of the connecting block.

In this way, when pouring water into the water sealing box 1, the floating bell-shaped cover 2 and the floating component 6 ascend due to buoyancy forces, and when the floating bell-shaped cover 2 and the floating component 6 ascend to a certain degree, the connecting blocks may be stuck in the connecting gap 132, thus stopping the floating bell-shaped cover 2 and the floating component 6 from ascending further. For this solution, as shown in FIG. 11, multiple water inlet holes 131 may be provided in the upper cover 13, to allow the water flow to smoothly enter the water sealing box 1 from outside.

For this structure, the maximum displacement of ascending of the floating bell-shaped cover 2 and the floating component 6 may be changed by changing the position of the connecting blocks in the vertical direction. Furthermore, since the floating bell-shaped cover 2 and the floating component 6 having this structure can ascend to an upper side of the upper cover 13, the heights of the floating bell-shaped cover 2 and the floating component 6 may be set high, and the heights of the floating bell-shaped cover 2 and the floating component 6 may be identical, and may also be different.

Of course, the upper cover 13 for limiting the maximum displacement of ascending of the floating bell-shaped cover 2 and the floating component 6 is not limited to this structure. In another specific solution, the upper cover 13 may also be configured in a shape which entirely covers the water sealing box 1. For example, for the rectangular water sealing box 1 as shown in FIG. 4, the upper cover 13 is configured in an overall rectangular shape, that is, the floating bell-shaped cover 2 and the floating component 6 are all covered below the upper cover 13.

In this way, when pouring water into the water sealing box 1, the floating bell-shaped cover 2 and the floating component 6 ascend due to the buoyancy forces, and when the floating bell-shaped cover 2 and the floating component 6 ascend to a certain degree, the top end of the floating bell-shaped cover 2 and the top end of the floating component 6 come into contact with the upper cover 13, thus the floating bell-shaped cover 2 and the floating component 6 are stopped from further ascending. For this solution, water inlet gaps may be arranged respectively between the upper cover 13 and a side wall of the water sealing box 1, to allow the water to flow through the water inlet gaps to enter the water sealing box 1 from outside.

Specific structures of several multi-layer water sealing device and the self-locking components thereof are listed hereinbefore, and it is to be noted that, the multi-layer water sealing device according to the present application is not limited to the above several structures, and all the multi-layer water sealing devices, in which the floating component 6 is offset to generate unbalanced buoyancy forces for preventing the floating bell-shaped cover 2 from being suctioned onto the bottom wall of the water sealing box 1 due to a negative pressure in the drain pipe 3, are fall into the scope of protection of the present application.

In another specific embodiment, as shown in FIG. 9, the self-locking component is further provided with an anti-slip component 7 configured to prevent the floating bell-shaped cover 2 from slipping with respect to the water sealing box 1 in the self-locking travel.

In this way, on the basis of the self-locking component, the anti-slip component 7 can further increase the friction force between the floating bell-shaped cover 2 and the inner wall 11 of the water sealing box when they are in contact with each other, to prevent the situation that the inner wall of the floating bell-shaped cover 2 and the inner wall 11 of the water sealing box are tending to slip with respect to each other due to smooth attachments on their surfaces after the water sealing device is used for a long time, thereby preventing the floating bell-shaped cover 2 from continuing to incline and descend, and further improves the anti-suction effect of the floating bell-shaped cover 2.

In a specific solution, as shown in FIG. 9, the anti-slip component 7 may be embodied as a protruding edge or a groove arranged on the self-locking component.

The protruding edge or the groove has a good anti-slipping effect, and has a simple structure, and is convenient to manufacture, which allows the anti-slip component 7 to has a low production cost. Of course, the anti-slip component 7 may also have other structures, for example, the anti-slip component 7 may be embodied as a screw thread on the self-locking component, and etc.

In another specific embodiment, an initial water passage 8 is a microcosmic gap formed between a bottom end of the floating bell-shaped cover 2 and the bottom wall of the water sealing box 1 when they are in full contact with each other.

With this structure, not only the floating bell-shaped cover 2 can be activated, but also the lower layer water seal can be closed to a certain degree in a normal condition. Here, "microcosmic gap" means that it is not intentionally to provide the gap between the floating bell-shaped cover 2 and the bottom wall of the water sealing box 1, but the gap is a very small natural gap formed between the bottom end of the floating bell-shaped cover 2 and the bottom wall of the water sealing box when the floating bell-shaped cover 2 falls on the bottom wall of the water sealing box 1 under its gravity.

In another specific embodiment, as shown in FIG. 10, for a multi-layer water sealing device having a water trap 9, a resilient opening and closing device 10 may be provided in the drain pipe 3 or the water trap 9. The resilient opening and closing device 10 may include a fixed plate 101, a movable baffle plate 102 and a resilient component 103 arranged between the fixed plate 101 and the movable baffle plate 102, and the movable baffle plate 102 is provided with a fluid through hole 104.

When a striking effect of the water flow is small, the resilient component 103 contracts, and the movable baffle plate 102 is close to the fixed plate 101, and the resilient opening and closing device 10 is in a closed state, and in this time, the water flow can flow into the water trap only via the fluid through hole 104 in the movable baffle plate 102, and this state is indicated by dotted lines in FIG. 10.

When the striking effect of the water flow is big, the resilient component 103 is pushed to extend, which further pushes the movable baffle plate 102 to move downwards to be away from the fixed plate 101, and thus the water trap is opened, and the water flow flows into the water trap 9 through the gap between the movable baffle plate 102 and the inner wall of the drain pipe 3 and the fluid through hole 104, and this state is indicated by solid lines in FIG. 10.

With this structure, when the user pours a large amount of water into the water sealing box 1 suddenly, the water needs to burst open the resilient opening and closing device 10 first, and then continues to flow into the water trap 9, thus achieving a buffering effect, and preventing a large amount of water from flowing away via the water trap 9 rapidly without any resistance in which case a negative pressure may be generated to suction the floating bell-shaped cover 2 onto the bottom of the water sealing box 1. Also, it is ensured that even a small amount of water can enter the water trap 9 smoothly as well. Specifically, the resilient component 103 may be a spring, or other rubbers having a good elasticity and a good retractility.

Furthermore, a multi-layer water sealing method is also provided according to the present application, which provides at least two layers of water seals arranged sequentially from top to down. An upper-layer water seal has a floating bell-shaped cover structure, and the floating bell-shaped cover structure includes a water sealing box 1 and a floating bell-shaped cover 2 arranged in the water sealing box 1. A lower-layer water seal is arranged in a drain pipe 3 below the floating bell-shaped cover 2. Most importantly, in the method, one side of the water sealing box 1 is extended to form or connected to a communication cavity offset from the drain pipe 3, and correspondingly, the floating bell-shaped cover 2 also is extended to form or connected to the floating component 6 floating in the communication cavity and offset from the drain pipe 3. In other words, the drain pipe 3 is offset from a center of the water sealing box 1 and is arranged adjacent to a first side (the left side in FIG. 3) of the water sealing box 1, and the floating bell-shaped cover 2 is arranged corresponding to the drain pipe 3 and adjacent to the first side of the water sealing box 1; and the floating component 6 connected to the floating bell-shaped cover 2 is further provided in the water sealing box 1 and floatable in the water sealing box 1, and the floating component 6 is away from the drain pipe 3 and adjacent to a second end (the right side in FIG. 3), opposite to the first end, of the water sealing box 1.

In a specific solution, according to the multi-layer water sealing method, at least one self-locking component is provided between the floating bell-shaped cover 2 and the water sealing box 1, and/or between the floating component 6 and the water sealing box 1, and/or between the water sealing box 1 and the connecting member 5, and the self-locking component is configured to prevent the floating bell-shaped cover 2 from being suctioned by the water flow to separately sink to fit against the bottom of the water sealing box 1.

In a specific solution, the self-locking component is further provided with an anti-slip component 7 configured to prevent the floating bell-shaped cover 2 from slipping with respect to the water sealing box during the self-locking travel.

Since the above multi-layer water sealing device has the above technical effects, the multi-layer water sealing method corresponding to the multi-layer water sealing device also has the same technical effects, which are not described here.

A multi-layer water sealing device and a multi-layer water sealing method according to the present application are described in detail hereinbefore. The principle and the embodiments of the present application are illustrated herein by specific examples. The above description of examples is only intended to help the understanding of the method and concept of the present application. It should be noted that, for the person skilled in the art, a few of modifications and improvements may be made to the present application without departing from the principle of the present application, and these modifications and improvements are also deemed to fall into the scope of protection of the present application defined by the claims.

What is claimed is:

1. A multi-layer water sealing device, comprising at least two layers of water seal sequentially arranged from top to bottom, wherein an upper-layer water seal has a floating bell-shaped cover structure, and the floating bell-shaped cover structure comprises a water sealing box and a floating bell-shaped cover arranged in the water sealing box; and a lower-layer water seal is arranged in a drain pipe below the floating bell-shaped cover, and wherein, the drain pipe is offset from a center of the water sealing box and is arranged adjacent to a first side of the water sealing box, and the floating bell-shaped cover is arranged corresponding to the drain pipe and adjacent to the first side of the water sealing box; and wherein, a floating component connected to the floating bell-shaped cover is further provided in the water sealing box and floatable in the water sealing box, and the floating component is away from the drain pipe and adjacent to a second end, opposite to the first end, of the water sealing box.

2. The multi-layer water sealing device according to claim 1, wherein the floating component is an additional bell-shaped cover.

3. The multi-layer water sealing device according to claim 2, wherein the floating bell-shaped cover is connected to the floating component by a connecting member.

4. The multi-layer water sealing device according to claim 3, wherein, a bottom end of the connecting member is provided with a partition extending downwards, to separate the floating bell-shaped cover from the floating component.

5. The multi-layer water sealing device according to claim 3, wherein at least one self-locking component is provided between the floating bell-shaped cover and the water sealing box, and/or between the floating component and the water sealing box, and/or between the connecting member and the water sealing box, and the at least one self-locking component is configured to prevent the floating bell-shaped cover from being suctioned by a water flow to separately sink to fit against a bottom of the water sealing box.

6. The multi-layer water sealing device according to claim 5, wherein the self-locking component comprises an inner wall of the water sealing box and an outer wall of the floating bell-shaped cover, a first self-locking gap is provided between the inner wall of the water sealing box and the outer wall of the floating bell-shaped cover, and the first self-locking gap is configured to enable the inner wall of the water sealing box and the outer wall of the floating bell-shaped cover to come into contact with each other when the floating bell-shaped cover inclines and descends to a preset position;

or, the self-locking component comprises the inner wall of the water sealing box and an outer wall of the floating component, a second self-locking gap is provided between the inner wall of the water sealing box and the outer wall of the floating component, and the second self-locking gap is configured to enable the inner wall of the water sealing box and the outer wall of the floating component to come into contact with each other when the floating bell-shaped cover descends to the preset position.

7. The multi-layer water sealing device according to claim 5, wherein the self-locking component comprises an extending portion, and the extending portion is configured to enable an inner wall of the water sealing box to come into contact with an outer wall of the floating bell-shaped cover when the floating bell-shaped cover inclines and descends to a preset position, or enable the inner wall of the water sealing box to come into contact with an outer wall of the floating component when the floating bell-shaped cover inclines and descends to the preset position; and the extending portion is arranged on the inner wall of the water sealing box, and/or the outer wall of the floating bell-shaped cover, and/or the outer wall of the floating component, and/or an outer wall of the connecting member.

8. The multi-layer water sealing device according to claim 5, wherein the connecting member between the floating bell-shaped cover and the floating component is provided with a vertical through hole, and the self-locking component is a positioning column arranged in the through hole, a self-locking gap is formed between the positioning column and an inner wall of the through hole, and is configured to allow the positioning column to come into contact with the inner wall of the through hole when the floating bell-shaped cover inclines and descends to a preset position.

9. The multi-layer water sealing device according to claim 5, wherein the connecting member between the floating bell-shaped cover and the floating component is provided with a vertical through hole, and a positioning column is provided in the vertical through hole, and a bottom end of the positioning column is fixedly connected to a bottom wall of the water sealing box; the self-locking component comprises a first engaging member arranged on an inner wall of the vertical through hole, and further comprises a second engaging member arranged at a top end of the positioning column at a side toward the floating component, and when the floating bell-shaped cover inclines and descends to a preset position, the first engaging member is engaged with the second engaging member.

10. The multi-layer water sealing device according to claim 5, wherein the self-locking component is further provided with an anti-slip component configured to prevent the floating bell-shaped cover from slipping with respect to the water sealing box in a self-locking travel.

11. The multi-layer water sealing device according to claim 10, wherein the anti-slip component is a protruding edge or a groove arranged in the self-locking component.

12. A multi-layer water sealing method, comprising providing at least two layers of water seal arranged sequentially from top to bottom, wherein an upper-layer water seal is a floating bell-shaped cover structure, and the floating bell-shaped cover structure comprises a water sealing box and a floating bell-shaped cover arranged in the water sealing box; and a lower-layer water seal is arranged in a drain pipe below the floating bell-shaped cover, wherein, the drain pipe is offset from a center of the water sealing box and is arranged adjacent to a first side of the water sealing box, and the floating bell-shaped cover is arranged corresponding to the drain pipe and adjacent to the first side of the water sealing box; and wherein, a floating component connected to the floating bell-shaped cover is further provided in the water sealing box and floatable in the water sealing box, and the floating component is away from the drain pipe and adjacent to a second end, opposite to the first end, of the water sealing box.

13. The multi-layer water sealing method according to claim 12, comprising providing at least one self-locking component between the floating bell-shaped cover and the water sealing box, and/or between the floating component and the water sealing box, and/or between the connecting member and the water sealing box, and the at least one self-locking component is configured to prevent the floating bell-shaped cover from being suctioned by a water flow to separately sink to fit against a bottom of the water sealing box.

14. The multi-layer water sealing method according to claim 13, wherein the self-locking component is further provided with an anti-slip component configured to prevent the floating bell-shaped cover from slipping with respect to the water sealing box in a self-locking travel.

\* \* \* \* \*